United States Patent

Atarashi et al.

Patent Number: 5,985,466
Date of Patent: Nov. 16, 1999

[54] POWDER HAVING MULTILAYERED FILM ON ITS SURFACE AND PROCESS FOR PREPARING THE SAME

[75] Inventors: Takafumi Atarashi, Tokyo; Katsuto Nakatsuka, 3-5-1403, Moniwadai 4-chome, Taihaku-ku, Sendai-shi, Miyagi 982-02, both of Japan

[73] Assignees: Nittetsu Mining Co., Ltd., Tokyo; Katsuto Nakatsuka, Miyagi, both of Japan

[21] Appl. No.: 08/913,243
[22] PCT Filed: Mar. 13, 1996
[86] PCT No.: PCT/JP96/00628
§ 371 Date: Sep. 10, 1997
§ 102(e) Date: Sep. 10, 1997
[87] PCT Pub. No.: WO96/28269
PCT Pub. Date: Sep. 19, 1996

[30] Foreign Application Priority Data

Mar. 14, 1995 [JP] Japan ................... 7-080832

[51] Int. Cl.$^6$ ........................................ B22F 1/02
[52] U.S. Cl. .................. 428/570; 148/513; 427/127; 427/216; 427/217; 427/229; 427/383.7; 427/405; 427/419.2
[58] Field of Search ............... 148/513; 427/127, 427/216, 217, 229, 383.7, 405, 419.2; 428/570

[56] References Cited

U.S. PATENT DOCUMENTS 5,763,085  6/1998  Atarashi et al. .................... 428/403

FOREIGN PATENT DOCUMENTS

| 0 328 906 A2 | 8/1989 | European Pat. Off. . | |
| 59-31003 | 2/1984 | Japan | H01F 1/06 |
| 4-269804 | 9/1992 | Japan | H01F 1/06 |
| 6-228604 | 8/1994 | Japan | B22F 1/02 |

OTHER PUBLICATIONS

Patent Abstracts of Japan vol. 015, No. 300 (P–1232), Jul. 30, 1991 & JP 03 103865 A (Toppan Printing Co. Ltd), Apr. 30, 1991 abstract.

International Search Report.

*Primary Examiner*—Daniel J. Jenkins
*Attorney, Agent, or Firm*—Sughrue, Mion, Zinn, Macpeak & Seas, PLLC

[57] ABSTRACT

A powder having metal oxide films on its surface is obtained in which the films have a heightened refractive index and which hence shows a high reflectance and has a bright color. A powder is obtained which has a reduced number of metal oxide films on the surf ace and hence has a small particle diameter. A powder having a multilayered film on the surface which comprises a base particle having on the surface thereof a multilayered film comprising at least a metal oxide film formed by the hydrolysis of a metal alkoxide, and in which the multilayered film has undergone a heat treatment. A process for producing any of the above powders which comprises dispersing a base particle into a solution of a metal alkoxide, hydrolyzing the metal alkoxide to obtain a metal oxide and deposit a film of the metal oxide on the surface of the base particle, conducting the foregoing steps two or more times to form a multilayered film, and performing a heat treatment in at least the final step, and in which the multilayered film is regulated so as to have an appropriate combination of constituent materials and appropriate film thicknesses to change the interference colors of the multilayered film and thus impart a bright color to the powder.

40 Claims, 2 Drawing Sheets

↓ INDICATES PEAK POSITION

↓ INDICATES PEAK POSITION

POWDER HAVING MULTILAYERED FILM ON ITS SURFACE AND PROCESS FOR PREPARING THE SAME

TECHNICAL FIELD

The present invention relates to a powder having at least a multilayered metal oxide film on the surface thereof and a process for producing the powder. More particularly, the present invention relates to a powder which has at least a multilayered metal oxide film on the surface thereof and is suitable for use as a magnetic coloring material in magnetic color toners, magnetic color inks, etc., and to a process for producing the powder.

BACKGROUND ART

The technique of coating powder particles with another substance for using the powder in various applications is known. With progress in various technical fields, there is a growing desire for a powder having singular properties, in particular, a metal powder or a metal compound powder. Specifically, there is a desire for a powder which combines the properties characteristic of a powder, in particular a metal or metal compound powder, and other properties and hence has multiple functions.

For example, magnetic metal powders as they are cannot be used as raw materials for magnetic color toners because of the color thereof, although their color has not posed any problem in conventional black magnetic toners. Coated powders obtained by the conventional known technique in which a thin metal oxide film is formed on the surface of powder particles to modify the surface for the purpose of, for example, protecting the powder or facilitating the mixing of the powder with synthetic resins or other substances cannot satisfy new requirements in such fields. From this standpoint, it is necessary to provide a powder having a novel constitution not seen in any prior art powder.

The present inventors previously invented a powder having on the surface thereof at least one metal oxide film which has a uniform thickness of from 0.01 to 20 $\mu$m and in which the metal contained is different from the metal constituting the base particles, in order to provide a powder, in particular a metal or metal compound powder, which has multiple properties and performs multiple functions so as to satisfy those new requirements (JP-A-6-228604).

If the above powder has two or more layers of the metal oxide film, a special function can be imparted thereto by regulating the thicknesses of the individual layers. For example, when coating films which differ in refractive index are formed on the surface of powder particles each in a thickness corresponding to ¼ of the wavelength of a light, the coated powder reflects all the light. By applying this technique to a powder comprising magnetic core particles, e.g., a powder of a metal such as iron, cobalt, or nickel or an alloy of such a metal or a powder of iron nitride, it is possible to produce a magnetic powder for magnetic toners which reflects all light and has a bright white color.

A magnetic color toner can be produced from the above powder by forming a colored layer on the powder particles and further forming a resin layer thereon.

The present inventors improved the above powder and invented a powder having a multilayered coating which comprises not metal oxide films alone but metal oxide films stacked alternately with metal films (JP-A-7-90310). This powder has excellent properties which render the powder suitable for use in magnetic color toners, etc.

For producing these powders, it is necessary to form, on powder particles, metal oxide films which each is uniform in thickness. Although this may be attained by precipitating a metal oxide or a metal compound as a precursor therefor from an aqueous solution of a metal salt, this technique is difficult. Hence, the present inventors developed a method which comprises dispersing particles of the above-described powder into a solution of a metal alkoxide and then hydrolyzing the metal alkoxide to form a metal oxide film on the powder particles. By the use of this method, it has become possible to form a metal oxide film which is thin and uniform in thickness, in particular to form a multilayered metal oxide film.

Specifically, the above method is carried out as follows. Powder particles, in particular particles of a metal or metal compound, are dispersed into a solution of a metal alkoxide, and the metal alkoxide is hydrolyzed to obtain a metal oxide on the surface of the particles and deposit a film of the metal oxide on the surface thereof. Subsequently, the metal oxide film is dried. These steps are conducted repeatedly to form a multilayered metal oxide film. By changing the kind of the metal oxide constituting the multilayered metal oxide film, the reflectance for the powder can be changed. It has been found that by selecting a combination of two adjacent metal oxide films so as to result in the maximum reflectance, a powder having a high whiteness can be obtained.

The present inventors thus succeeded in obtaining a powder having a high whiteness by the method described above. In the field of electrophotography and the like, it has become necessary to obtain images having better resolution and high contrast. Accordingly, the magnetic color toners for use in electrophotographic copiers and the like are required not only to have a reduced particle diameter to heighten resolution but also to be colored in a bright hue, in order to form clear images.

Consequently, the powders for use as raw materials for toners are required to have a smaller particle size and a higher whiteness.

In order for a powder to have a higher whiteness, the powder itself should show a higher reflectance. Furthermore, use of a powder having a reduced particle diameter is highly advantageous in that the powder shows enhanced scattering reflection as a whole, is effective in attaining a reduction in toner particle diameter due to the small particle diameter of the powder, and is hence useful for obtaining clear images having heightened resolution.

Forming a multilayered metal oxide film on powder particles in a manner such as that described above serves to increase the diameter of the particles and is hence disadvantageous from the standpoint of obtaining a powder having high whiteness. Although a multilayered metal oxide film in which each layer has a smaller thickness is more advantageous, the method in which a metal alkoxide is used has a problem that it is difficult to obtain a thin metal oxide film having a high density. Furthermore, the prior art technique for obtaining toners of various colors which comprises forming a film consisting mainly of a dye or pigment on white toner particles has a problem that the toners disadvantageously have a large particle diameter due to the film and have poor color brightness.

An object of the present invention is to obtain a powder having a multilayered metal oxide film on the surface thereof, in particular a metal or metal compound powder having any of bright colors including white.

Furthermore, an object of the present invention is to obtain a powder having a multilayered metal oxide film on the surface thereof, in particular a metal or metal compound powder having a reduced particle diameter and any of bright colors including white.

Moreover, an object of the present invention is to provide a magnetic powder suitable for use as a raw material for a magnetic color toner used particularly in electrophotographic copiers and the like, or to provide a thermally conductive powder having electrical insulating properties.

Also, an object of the present invention is to provide a novel process for producing a powder, in particular a metal or metal compound powder, which has any of bright colors including white and a multilayered metal oxide film and which has multiple properties and performs multiple functions.

DISCLOSURE OF THE INVENTION

In order to accomplish the above objects, the present inventors have found the following. In the technique of forming a multilayered film having at least a metal oxide film on the surface of base particles by dispersing the particles into a solution of a metal alkoxide and then hydrolyzing the metal alkoxide, the reflectance of light incident upon the multilayered film can be heightened by heat-treating the multilayered film. The heat treatment is also effective in reducing the thickness of the multilayered film to obtain a powder having a reduced diameter. In addition, by regulating the combination of the materials of the multilayered film and regulating the thicknesses of the constituent layers, the interference waveform of the light reflected by the multilayered film can be regulated. The present invention has been achieved based on these findings.

According to the present invention, the objects described above can be accomplished by the following means.

(1) A powder having a-multilayered film on its surface which comprises base particle having provided thereon a multilayered film (a) comprising at least a metal oxide film formed by hydrolyzing a metal alkoxide, and (b) is treated by heating.

(2) The powder having a multilayered film on its surface according to the above (1), wherein the base particle is a metal particle or a metal compound particle.

(3) The powder having a multilayered film on its surface according to the above (1), wherein the base particle has magnetic properties.

(4) The powder having a multilayered film on its surface according to the above (1), wherein the multilayered film has at least one metal film.

(5) The powder having a multilayered film on its surface according to the above (1), wherein the unit film layers constituting the multilayered film each have a thickness so as to have an interference reflection peak or an interference transmission bottom at the same specific wavelength.

(6) The powder having a multilayered film on its surface according to the above (5), wherein the actual thickness of each unit film layer is decided by correcting a basic film thickness which satisfies the following equation (1):

$$\tilde{n}d = m \times \lambda/4 \quad (1)$$

(wherein $\tilde{n}$ represents the complex refractive index; d represents the basic film thickness; m represents an integer (natural number); λ represents the wavelength at which the interference reflection peak or the interference transmission bottom appears; and $\tilde{n}$ is defined by the following equation (2):

$$\tilde{n} = n + i\kappa \quad (2)$$

(wherein n represents the refractive index of each unit film layer; i represents a complex number; and κ represents the attenuation coefficient))
based on functions consisting of a phase shift attributable to the attenuation coefficient κ of refractive index, a phase shift occurring at a film interface, the dispersion of refractive index, and a peak shift attributable to the particle shape so that the individual unit film layers have an interference reflection peak or an interference transmission bottom at the same specific wavelength.

(7) A process for producing a powder having a multilayered film on its surface which comprises:

dispersing a base particle into a solution of a metal alkoxide;

hydrolyzing the metal alkoxide to obtain a metal oxide and deposit a film of the metal oxide on the surface of the base particle;

drying the metal oxide film;

subsequently heat-treating the dried metal oxide film to form a heat-treated metal oxide film; and conducting the above steps at least once to form a multilayered film.

(8) A process for producing a powder having a multilayered film on its surface which comprises:

dispersing a base particle into a solution of a metal alkoxide;

hydrolyzing the metal alkoxide to obtain a metal oxide and deposit a film of the metal oxide on the surface of the base particle;

drying the metal oxide film to form a dried metal oxide film;

conducting the above steps at least once to form a multilayered film; and heat-treating the multilayered film as a final step.

(9) A process for producing a powder having a multilayered film on its surface which comprises:

dispersing a base particle into a solution of a metal alkoxide;

hydrolyzing the metal alkoxide to obtain a metal oxide and deposit a film of the metal oxide on the surface of the base particle;

conducting the above steps at least once to form a multilayered film;

drying the multilayered film; and heat-treating the dried multilayered film.

(10) The process for producing a powder having a multilayered film on its surface according to any one of the above (7) to (9), wherein at least one metal film is formed before the steps of forming a metal oxide film on the surface of the base particle or between or after the steps of forming a metal oxide film.

(11) The process for producing a powder having a multilayered film on its surface according to any one of the above (7) to (10), wherein the thicknesses of the unit film layers constituting the multilayered film are regulated so that the unit film layers have an interference reflection peak at the same specific wavelength.

(12) The process for producing a powder having a multilayered film on its surface according to the above (11), wherein the actual thickness of each unit film layer is decided by correcting a basic film thickness which satisfies the following equation (1):

$$\tilde{n} \times d = m \times \lambda/4 \qquad (1)$$

(wherein ñ represents the complex refractive index; d represents the basic film thickness; m represents an integer (natural number); λ represents the wavelength at which the interference reflection peak or the interference transmission bottom appears; and n is defined by the following equation (2):

$$\tilde{n} = n + i\kappa \qquad (2)$$

(wherein n represents the refractive index of each unit film layer; i represents a complex number; and κ represents the attenuation coefficient))
based on functions consisting of a phase shift attributable to the attenuation coefficient κ of refractive index, a phase shift occurring at a film interface, the dispersion of refractive index, and a peak shift attributable to the particle shape so that the individual unit film layers have an interference reflection peak or an interference transmission bottom at said same specific wavelength.

In the present invention, base particles are coated with a metal oxide film, and the metal oxide film formed is heat-treated to heighten the density of the metal oxide constituting the film and heighten the refractive index of the film. Thus, the difference in refractive index between a metal oxide film having a high refractive index and a metal oxide film having a low refractive index is increased, and a further reduction in particle diameter is attained. The heat treatment is conducted at a temperature not lower than those ordinarily used for drying. Although the temperature for the heat treatment is not particularly limited as long as it is 100° C. or higher so as to remove organic substances, it is usually from 120° C. to 1000° C., preferably from 300° C. to 600° C., more preferably from 400° C. to 550° C. The lower limit thereof may preferably be 200° C. or 250° C.

The atmosphere for th heat treatment may be air in the case where further oxidation of the metal oxide film in the oxidizing atmosphere is desired or where the oxidized state of the film remains unchanged in the oxidizing atmosphere. A nitrogen atmosphere or another inert gas atmosphere may be used in the case where the oxidized state of the film is desired to remain unchanged.

The heat treatment may be conducted after each operation for coating with a metal oxide film, or after two or more metal oxide films have been successively formed.

The second or any subsequent operation for coating may be conducted after hydrolysis without performing drying, or may be conducted after drying.

A method for forming a multilayered film consisting of layers of a high-refractive-index substance which are stacked alternately with layers of a low-refractive-index substance, according to the present invention, will be explained below.

A metal oxide film having a high refractive index is formed as follows. The particles described above are dispersed into an alcohol solution of an alkoxide of titanium, zirconium, or the like. A solution prepared by mixing water with an alcohol and a catalyst is added dropwise to the dispersion with stirring to hydrolyze the alkoxide and form on the particle surface a titanium oxide film or zirconium oxide film as a high-refractive-index film. The coated particles are taken out by solid-liquid separation, vacuum-dried, and then subjected to a heat treatment. When the particles are unsusceptible to oxidation, they are heated in air. When the particles are susceptible to oxidation, they are heated in an inert atmosphere. The heat treatment is conducted at 300 to 600° C. for 1 minute to 3 hours.

Subsequently, the particles coated with a high-refractive-index film are dispersed into an alcohol solution of a metal alkoxide which gives a low-refractive-index oxide, such as a silicon alkoxide or an aluminum alkoxide. A solution prepared by mixing water with an alcohol and a catalyst is added dropwise to the dispersion with stirring to hydrolyze the alkoxide and form on the particle surface a silicon oxide or aluminum oxide film as a low-refractive-index film. The thus-coated particles are taken out by solid-liquid separation, vacuum-dried, and then subjected to a heat treatment in the same manner as the above.

Through the operations described above, a powder is obtained in which each particle has on the surface thereof two layers consisting of a metal oxide film having a high refractive index and a metal oxide film having a low refractive index.

By repeating the above-described operations for forming metal oxide films, a powder having a multilayered metal oxide film on the surface thereof is obtained. When a multilayered film is formed in such a manner that metal oxide films having a high refractive index are stacked alternately with metal oxide films having a low refractive index as stated above, the powder obtained has a high reflectance and a high whiteness.

The drying in the operations described above may be any of vacuum drying with heating, vacuum drying, and air drying. It is also possible to conduct the drying with a spray dryer in a regulated inert atmosphere.

The conditions for the heat treatment include a temperature of from 300° C. to 600° C. and a treatment period of from 1 minute to 3 hours. Powders unsusceptible to oxidation may be treated in an air atmosphere, while powders susceptible to oxidation may be treated in an inert atmosphere. These conditions including heat treatment time are decided so that the density and refractive index of the oxide can be heightened.

In the operations for forming metal oxide films, it is preferred to employ a method in which solid-liquid separation, drying, and heat treatment are conducted after the formation of each metal oxide film. This is because the resultant metal oxide films have a high density and show tenacious adhesion to the base particles or to each other, thereby giving a high-quality powder.

It is possible to use a method in which particles coated with a metal oxide film by hydrolysis in a coating operation are taken out by solid-liquid separation and then, without being dried, placed in an alcohol solution of a metal alkoxide for the subsequent coating operation. In this case, drying and heat treatment may be conducted in a final step.

Alternatively, use may be made of a method in which each coating operation is conducted up to drying, and heat treatment is conducted as a final step. This method is advantageous in that the procedure is simple and a cost reduction can be attained.

The base particles on which metal oxide films are to be formed in the present invention are not particularly limited. If the base particles are made of a metal, the metal may be any of iron, nickel, chromium, titanium, aluminum, and others. If magnetic properties of base particles are to be utilized, magnetic particles made of, e.g., iron are preferred. An alloy of any of those metals may be used. Preferred among magnetic particles are particles made of a ferromagnetic alloy.

If the base particles are made of a metal compound, typical examples of the compound include oxides of the aforementioned metals. Specific examples thereof include oxides of metals such as iron, nickel, chromium, titanium, aluminum, and silicon and oxides of other metals including calcium, magnesium, and barium. A mixed oxide comprising two or more of these may also be used. Examples of the metal compound other than metal oxides include metal nitrides and metal carbides. Specifically, iron nitride or the like is preferred.

Examples of the material of the base particles other than metals further include metalloids and metalloid compounds, in particular oxides, carbides, and nitrides. Specifically, silica, glass beads, and the like may be used.

The particles are not particularly limited in shape. Examples thereof include spheres, nearly spherical particles, and polyhedrons such as isotropic bodies, e.g., regular polyhedrons, rectangular parallelepipeds, spheroids, rhombohedrons, platy bodies, and acicular bodies (cylinders and prisms). Particles of irregular shapes such as pulverized particles can also be used.

In forming metal oxide films on the surface of such particles, each metal oxide film is formed so that the metal contained therein differs from the metal which either constitutes the particles or is contained as a component of the metal compound constituting the particles. This is because if particles made of, for example, a metal oxide are coated with a film of the same metal oxide, the film formed does not have different properties and is hence technically less advantageous.

The base particles are not particularly limited in particle diameter. However, they preferably have a particle diameter in the range of from 0.01 $\mu$m to several millimeters.

Examples of the metal oxides constituting the metal oxide films include oxides of iron, nickel, chromium, titanium, zinc, aluminum, cadmium, zirconium, and silicon. Also usable are oxides of calcium, magnesium, barium, and the like. A suitable kind of metal oxide is selected according to the properties to be imparted to the surface of the base particles.

Two or more metal oxide films are formed. Each metal oxide film is regulated so as to have a thickness of from 0.03 to 20 $\mu$m. Two or more layers can be formed by coating the surface of core particles with a film of a metal oxide different from the material of the cores and then successively forming thereon metal oxide films in each of which the metal oxide is the same as or different from the metal oxide constituting the first film. If desired and necessary, a resin layer or another layer may be formed on the metal oxide films.

In forming a metal oxide film, base particles are dispersed into a solution of an alkoxide of the metal serving as a component of the metal oxide, and the metal alkoxide is hydrolyzed to yield an oxide of the metal on the surface of the base particles. This technique for yielding a metal oxide by hydrolysis, which is called the sol-gel method, is effective in yielding an oxide which is fine and homogeneous in composition. By applying this method to a powder, a film having a uniform and large thickness is obtained.

A metal alkoxide corresponding to the desired metal oxide is selected. Examples thereof include alkoxides of zinc, aluminum, cadmium, titanium, zirconium, and silicon. In the production of a magnetic powder for a magnetic toner, an oxide of either titanium or silicon is frequently formed as a surface metal oxide. In this case, a silicon or titanium alkoxide is used.

Since metal alkoxides decompose by the action of water, they are used as a solution in an organic solvent. Examples of the organic solvent include alcohols such as ethanol, methanol, and isopropanol and ketones. It is preferred to use a dehydrated organic solvent. Although the concentration of the metal alkoxide solution varies depending on the kind of the metal alkoxide dissolved and on the kind of the organic solvent, the optimal conditions should be selected. The thickness of a metal oxide film deposited on particles is governed by the concentration of the metal alkoxide solution and by the use amount of the metal alkoxide solution based on the particles.

After metal or metal compound particles are dispersed into the metal alkoxide solution, water is added thereto to hydrolyze the metal alkoxide and to obtain a metal oxide and deposit the same on the particles. Thus, a metal oxide film is formed. The particles having the metal oxide film formed thereon are taken out of the solution and dried to obtain a tough metal oxide film.

Specifically, the formation of a metal oxide film may be carried out as follows. The particles described above are dispersed into a dehydrated alcohol, and a metal alkoxide solution is added thereto while sufficiently stirring the dispersion. A mixture of an alcohol and water or a mixture of an alcohol, water, and a catalyst is gradually added to the homogeneous mixture to hydrolyze the metal alkoxide and deposit a metal oxide on the surface of the particles. In the case of employing a silicon alkoxide or a zirconium alkoxide, which each hydrolyzes relatively slowly as compared with other metal alkoxides, another method may be used, in which the metal alkoxide is added simultaneously with a catalyst and water or is added after a mixture of water and a catalyst is added.

In the hydrolysis of a metal alkoxide, a sol of a metal oxide generates first. The sol turns into a gel thereafter. After the hydrolysis reaction, the gelation proceeds upon standing for a while. In some cases, the gelation is completed by drying. It is thought that the reaction yields the sol on the surface of the particles to form a continuous film, whereby a tough metal oxide film uniform in thickness and composition is easily formed. A metal oxide film having such properties cannot be obtained with any conventional precipitation or similar method.

When a titanium or aluminum alkoxide, which hydrolyzes rapidly, is used in the hydrolysis reaction, metal oxide particles generated from the alkoxide may come into a film to inhibit film formation. In this case, a film having enhanced uniformity can be formed by adding an alkanolamine to retard the reaction. In the case of using a zirconium or silicon alkoxide, which hydrolyzes very slowly, it is possible to add an acid such as hydrochloric acid or acetic acid, an alkali such as ammonia, urea, or sodium hydroxide, or an amine as a catalyst in order to accelerate the reaction. It is desirable to suitably use catalysts according to reaction rates in such a manner.

If aggregation occurs during hydrolysis, a surfactant may be added to improve dispersibility of the particles.

In the powder production process described above, a metal oxide film having excellent properties is obtained which is different from the metal oxide film obtained by merely oxidizing the surface of base particles made of a metal. This process is hence useful also for the coating of particles of a metal or metal compound with a film of a metal oxide in which the metal is the same as that constituting or contained in the base particles. Therefore, the process described above is applicable to the production of a metal or metal compound powder having such a metal oxide film. This application is included in the present invention.

The thus-produced powders having a multilayered metal oxide film on the surface thereof each combines various properties depending on the selected materials of the base particles and on the selected materials of the surface metal oxide films. The powders can hence be used in respective suitable applications. For example, a magnetic powder having a high whiteness is obtained by coating particles made of a magnetic material such as iron metal or tri-iron tetroxide with silicon oxide, having a lower refractive index, as an inner metal oxide film and then with titanium oxide, having a higher refractive index, as an outer film.

FIG. 1 is a sectional view diagrammatically illustrating the structure of a particle of a powder according to the present invention. This particle comprises a base particle 1 as a core and, formed on the surface thereof, a multilayered coating consisting of metal oxide films A 2 and metal oxide films B 3.

The powder particles according to the present invention are not limited to those consisting of a base particle having only a multilayered metal oxide film on the surface thereof. The powder particles may have a metal layer between two of those metal oxide films or on or beneath the metal oxide films. The presence of a metal layer serves to heighten the refractive index and impart a bright color.

The metal constituting the metal film is not limited to elemental metals and may be a metal alloy. Examples of the elemental metals include silver metal, cobalt metal, nickel metal, and iron metal. Examples of the metal alloy include iron alloys such as iron-nickel and iron-cobalt alloys and iron alloy nitrides such as iron-nickel alloy nitrides and iron-nickel-cobalt alloy nitrides.

Techniques usable in the present invention for forming a metal film on the surface of base particles or on the surface of metal oxide films include electroless plating, contact electroplating, and sputtering. However, contact electroplating is disadvantageous in that particles not in contact with an electrode are-not plated, while sputtering is disadvantageous in that the particles are not evenly exposed to a metal vapor. Consequently, in the metal-coated powder obtained by either of these two techniques, the individual particles have different coating thicknesses. In contrast, film formation by electroless plating is preferred in that a dense and uniform film can be formed and the regulation of film thickness is easy. Although methods for film formation mainly by electroless plating will be described later, this should not be construed as limiting the use of other film-forming techniques. The metal film is preferably heat-treated after the formation thereof, like metal oxide films.

If a multilayered coating comprising metal oxide films and one or more metal films is to be formed on the surface of base particles, a special function can be imparted by regulating the thickness of each constituent layer. For example, a powder which reflects or absorbs light having a specific wavelength$\lambda$ (base on Fresnel interference reflection) is obtained by forming, on the surface of base particles, an appropriate number of alternate coating films having different refractive indexes and having appropriate thicknesses so that each film satisfies the following equation (1), namely, so as to have a thickness d corresponding to the refractive index n of the material constituting the coating film and to m (integer) times one fourth of the wavelength of a visible light.

$$nd = m\lambda/4 \qquad (1)$$

The above technique can be utilized as follows. On the surface of magnetic base particles, such as, e.g., a powder of a metal such as iron, cobalt, or nickel, a powder of an alloy of such a metal, or a powder of iron nitride, is formed an oxide film having such a thickness and a refractive index as to satisfy equation (1) for the wavelength of the target visible light. An oxide film having a different refractive index is then formed thereon. These two films each is formed once, or are repeatedly formed alternately. Thus, a multilayered film is formed which has a characteristic reflection or absorption wavelength width in the visible light region.

The sequence of film deposition is decided as follows. If the cores are made of a substance having a high refractive index, a film having a low refractive index is preferably formed as the first layer. If the cores are made of a low-refractive-index substance, a film having a high refractive index is preferably formed as the first film.

The thickness of a film is regulated by following the changes of optical film thickness, which is the product of the refractive index of the film and the thickness thereof, by means of a spectrophotometer or the like to determine changes in reflection waveform, etc.

The thickness of each film is designed so that a necessary reflection waveform is finally obtained.

If the individual unit films constituting a multilayered film have respecive reflection waveforms which differ from one another in peak position as shown in FIG. 2, the powder is white. On the other hand, when a multilayered film is formed so that the individual unit films have respective reflection waveforms having a peak precisely in the same position as shown in FIG. 3, a monochromatically colored powder, e.g., a blue, green, or yellow powder, can be obtained without using any dye or pigment.

However, in actually designing a powder, it is necessary to take account of particle diameter, particle shape, phase shift occurring at the film/core interface, peak shift attributable to the wavelength dependence of refractive index, etc.

For example, in the case of using base particles in the form of plane parallel plates such as mica or flaky ferric oxide, the Fresnel interference attributable to a parallel film formed on the plane particle surface is designed using the equation (1) in which n has been replaced by N, which is defined by the following equation (2).

In particular, if thin metal flakes, iron metal particles obtained by reducing the aforementioned platy ferric oxide, or semiconducting particles are used among plane parallel plates, the refractive index of metal fl in equation (2) includes attenuation coefficient κ. (In the case of transparent oxides (dielectrics), the values of κ were very small and negligible.) The above applies in the case of multilayered films containing-one or more metal films.

$$\tilde{n} = n + i\kappa \qquad (2)$$

(wherein i represents a complex number)

If the value of attenuation coefficient κ is large, the phase shift occurring at the film/core interface is enhanced, and this influences the thickness optimal for interference of each constituent layer of the multilayered film.

Accordingly, even when film thicknesses are regulated only geometrically, peak positions remain different and this results in a lighter color especially in monochromatic coloring. In order to avoid this, a design is made beforehand based on computer simulation so as to result in the optimal combination of film thicknesses, while taking account of the influence of phase shift on all films.

There also are phase shifts attributable to an oxide film present on a metal surface and peak shifts attributable to the wavelength dependence of refractive index.

For correcting these, a spectrophotometer or the like is used to find the optimal conditions so that a reflection peak or an absorption bottom appears at the target wavelength in a multilayered film made up of the final intended number of layers.

Interference by films formed on a curved surface such as the surface of spherical particles occurs in the same manner as on plane plates, basically in accordance with the Fresnel's interference principle. Consequently, coloring in white and coloring in a monochromatic hue can be designed by the methods explained by reference to FIGS. 2 and 3.

In the case of particles having a curved surface, however, the light which has struck on the particles and has been reflected by the same interferes complicatedly. The resultant interference waveforms are almost the same as those for plane plates when the number of the constituent layers of the film is small. However, as the total number of constituent layers increases, interference within the multilayered film becomes more complicated. In the case of such a multilayered film also, spectral reflection curves can be designed beforehand through computer simulation based on Fresnel interference so as to result in the optimal combination of film thicknesses.

In particular, in the case of film formation on the surface of base particles, the influences of phase shift on the particle surface and on all films are taken in account when a design is made beforehand through computer simulation so as to result in the optimal combination of film thicknesses.

Furthermore, the peak shift attributable to an oxide layer present on the base surface and the peak shift attributable to the wavelength dependence of refractive index are also taken in account.

In the actual production of samples, actual films are examined with a spectrophotometer or the like in order to correct designed spectral curves while changing film thicknesses. Thus, the optimal conditions are found so that a reflection peak or an absorption bottom appears at the target wavelength in a multilayered film made up of the final intended number of layers.

Also in the case of regulating the coloring of particles of an irregular shape, interference by a multilayered film occurs. In this case, a basic film design is made with reference to conditions for an interference multilayered film on spherical particles.

The optimal conditions should be found with a spectrophotometer or the like so that a reflection peak or an absorption bottom appears at the target wavelength in a multilayered film made up of the final intended number of layers, while varying film-forming conditions.

The peak position for each of the unit films constituting the above-described multilayered film can be regulated by changing the thickness thereof. The thickness of a unit film can be regulated by changing the composition of the solution, reaction time, and the number of feedstock additions. Thus, a desired color can be imparted.

As described above, white powders and monochromatically colored powders can be obtained by making computer simulation and finding the optimal conditions, while varying film-forming conditions including those for the film-forming solution, so that a reflection peak or an absorption bottom appears at the target wavelength in a multilayered film made up of the final intended number of layers.

An application of a magnetic toner obtained by the method described above is roughly explained below.

A photoreceptor is prepared which comprises a substrate consisting of, e.g., a polyester film, an electroconductive layer consisting of a vapor-deposited metal layer, and a photoconductive layer formed thereon by applying a dispersion obtained by dispersing fine particles of a photoconductive semiconductor such as, e.g., zinc oxide, a photosensitizer dye, a color sensitizer, a dispersing agent, etc. into a binder such as an acrylic resin.

The surface of the photoreceptor is evenly corona-charged. Reflected light from an image to be copied is caused to strike on the charged photoreceptor, upon which irradiation a positive charge image of the original is formed on the photoreceptor. This positive charge image is transferred to a support such as paper. Particles of the magnetic toner according to the present invention which have the charge opposite to that of the positive charge image are adhered to the support using a magnetic brush made up of magnetic toner particles, etc., and the magnetic toner particles present on the nonimage areas are removed to obtain on the photoreceptor a magnetic toner image corresponding to the original. Baking the magnetic toner image gives a copy image on the paper. If the paper is white and the magnetic toner produced from a powder of the present invention is a color toner, a novel copy image is obtained.

According to the present invention, a multilayered metal oxide film formed on the surface of particles can be made to have a heightened refractive index by heat-treating the film. Consequently, the number of constituent layers necessary to a multilayered metal oxide film to be formed on the surface of particles for giving a powder having the same reflectance as the desired value can be reduced. Namely, the powder can have a particle diameter reduced by a value corresponding to the attained reduction in the number of layers. As a result, the powder as a whole can have a heightened whiteness. For example, when a particle having a diameter of 1 $\mu$m is coated with a five-layered metal oxide film, the coated particle has a diameter of about 2 $\mu$m. In contrast, when the same reflectance can be obtained with a three-layered metal oxide film, this coated particle has a diameter as small as about 1.6 $\mu$m.

Furthermore, color development based on multilayered-film interference can be regulated by regulating the combination of substances constituting the multilayered film and regulating the thicknesses of the individual unit films. Consequently, a powder can be colored in a desired bright hue without using any dye or pigment.

BEST MODE FOR PRACTICING THE INVENTION

Figure 1:
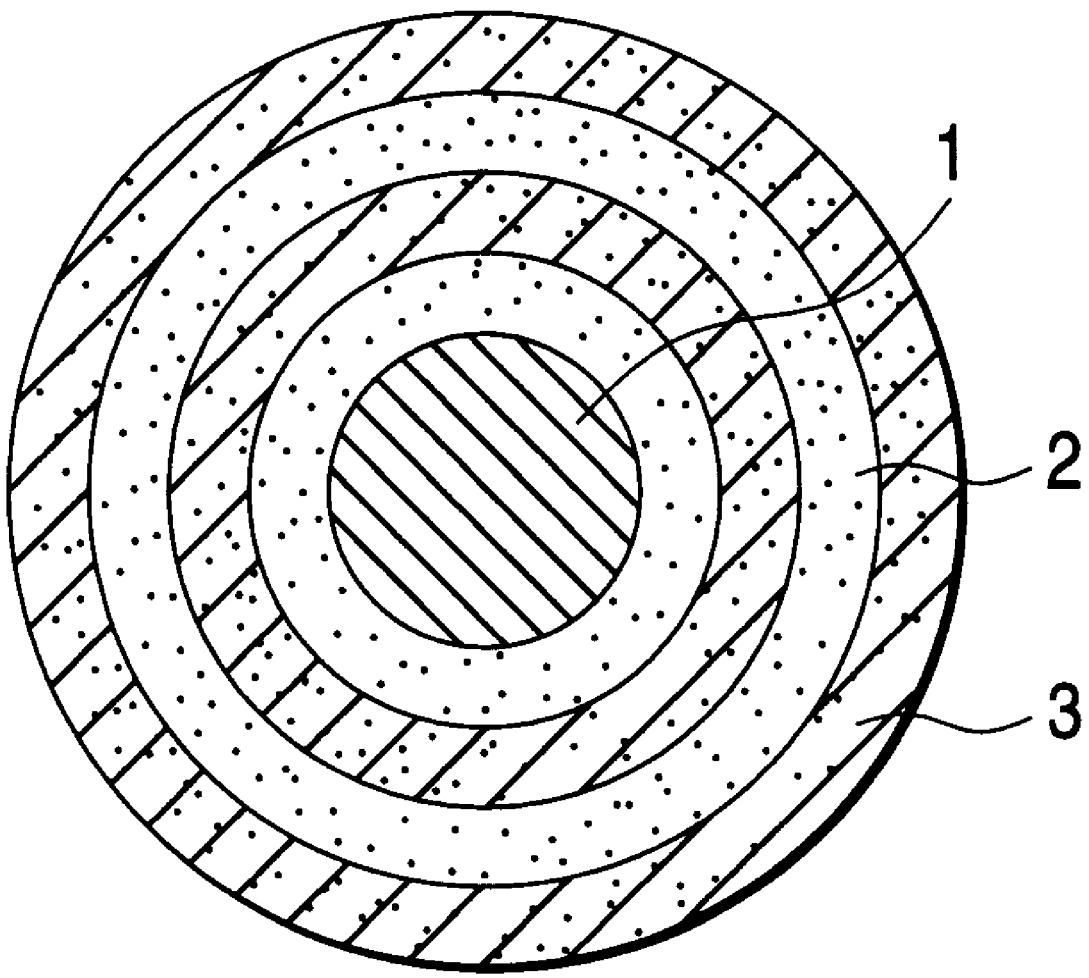
FIG. 1 is a sectional view diagrammatically illustrating a particle of a powder according to the present invention; numeral 1 denotes a base particle, 2 a metal oxide film A, and 3 a metal oxide film B.
Figure 2:
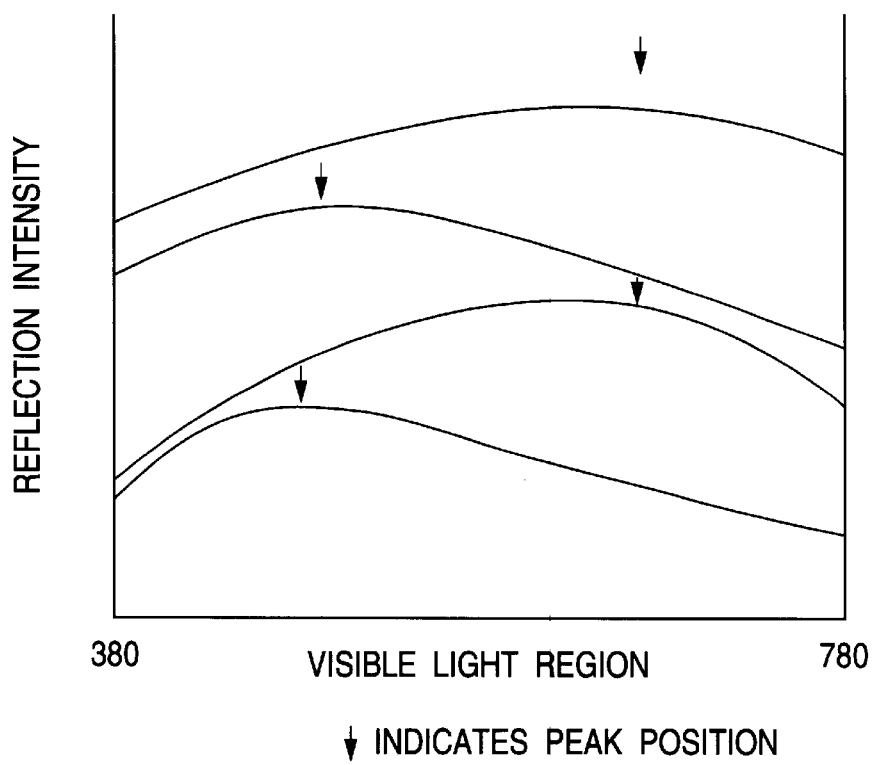
FIG. 2 is a graphic presentation illustrating the spectral waveforms of reflection intensity of the individual unit films constituting the multilayered film of a powder colored in white.
Figure 3:
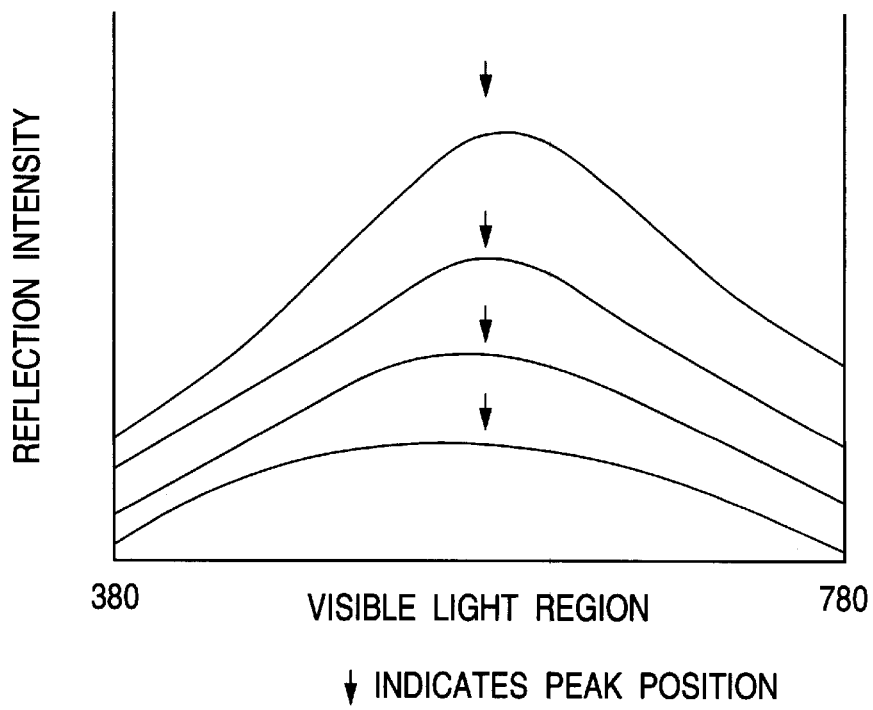
FIG. 3 is a graphic presentation illustrating the spectral waveforms of reflection intensity of the individual unit films constituting the multilayered film of a powder colored monochromatically.

The present invention will be explained below in more detail by reference to Examples, but the invention should not be construed as being limited to these Examples only.

EXAMPLE 1

(Coating with Titanium Dioxide Film)

In a vessel, 3.5 g of titanium ethoxide was mixed with 200 ml of dehydrated ethanol to prepare a solution. To this solution were added 5 g of glass beads (average particle diameter, 35 $\mu$m) manufactured by Toshiba Valotini Co. The resultant mixture was treated with an ultrasonic vessel to disperse the beads.

A solution prepared beforehand by mixing 2.0 g of water with 60 ml of ethanol was added dropwise to the solution containing glass beads with buret over a period of 15 minutes while stirring the bead-containing solution with a stirrer. Stirring was continued for 3 hours after the addition, and the solid matter was then separated from the liquid by filtration.

The solid matter obtained through filtration was dried at 100° C. for 5 hours with a vacuum dryer. The dried solid matter was placed in a baking boat, kept for 30 minutes in an electric furnace maintained at 500° C., and then taken out of the furnace and cooled.

Thus, glass beads coated with a titanium dioxide film (first layer) were obtained.

(Coating with Silicon Dioxide Film)

In a vessel, 5.5 g of silicon ethoxide was mixed with 200 ml of dehydrated ethanol to prepare a solution. To this solution were added 5 g of the glass beads coated with a titanium dioxide film (average particle diameter, 35 μm). The resultant mixture was treated with an ultrasonic vessel to disperse the beads.

A solution prepared beforehand by mixing 6.0 g of ammonia water with 11.5 ml of water was added to the solution containing glass beads with stirring with a stirrer. Stirring was continued for 3 hours after the addition, and the solid matter was then separated from the liquid by filtration.

The solid matter obtained through filtration was dried at 100° C. for 5 hours with a vacuum dryer. The dried solid matter was placed in a baking boat, kept for 30 minutes in an electric furnace maintained at 500° C., and then taken out of the furnace and cooled.

Thus, glass beads coated with a titanium dioxide film (first layer) and a silicon dioxide film (second layer) were obtained.

(Coating with Multilayered Film)

The operation for coating with a titanium dioxide film (to form third and fifth layers) and the operation for coating with a silicon dioxide film (to form a fourth layer) were alternately conducted twice and once, respectively, in the same manner as the above to obtain glass beads coated with five layers. The glass beads coated with five layers had a yellowish white color and a peak reflectance of 88%. These beads were ultraviolet-absorbing beads which absorbed almost all the ultraviolet rays having wavelengths not longer than 300 nm. The titanium dioxide films (first, third, and fifth layers) had a refractive index of 2.2 and a thickness of 76 nm, while the silicon dioxide films (second and fourth layers) had a refractive index of 1.4 and a thickness of 100 nm.

EXAMPLE 2

In a vessel, 3.5 g of titanium isopropoxide was mixed with 200 ml of dehydrated ethanol to prepare a solution. To this solution were added 5 g of glass beads (average particle diameter, 50 μm) manufactured by Toshiba Valotini Co. The resultant mixture was treated with an ultrasonic vessel to disperse the beads.

A solution prepared beforehand by mixing 2.4 g of water with 60 ml of ethanol was added dropwise to the solution containing glass beads with a buret over a period of 15 minutes while stirring the bead-containing solution with a stirrer. Stirring was continued for 3 hours after the addition, and the solid matter was then separated from the liquid by filtration.

The solid matter obtained through filtration was dried at 100° C. for 5 hours with a vacuum dryer. The dried solid matter was placed in a baking boat, kept for 30 minutes in an electric furnace maintained at 500° C., and then taken out of the furnace and cooled.

Thus, glass beads coated with a titanium dioxide film (first layer) were obtained.

A film consisting of alternate three layers was formed by conducting the subsequent procedure in the same manner as in Example 1, except that the concentration of silicon ethoxide was changed to 4.3 g. The thus-obtained glass beads coated with three layers had a light blue interference color, and the reflectance thereof at 455 nm was higher than the original glass beads by 15%. The titanium dioxide films (first, third, and fifth layers) had a refractive index of 2.2 and a thickness of 50 nm, while the silicon dioxide films (second and fourth layers) had a refractive index of 1.4 and a thickness of 81 nm.

EXAMPLE 3

In a beaker, 10 g of an iron carbonyl powder (average particle diameter, 1.8 μm) manufactured by BASF AG was mixed with 200 ml of dehydrated ethanol. Thereto were added, with stirring, 10.0 g of ammonia water (29%) and 11 g of deionized water, followed by 10.4 g of silicon ethoxide. After stirring was then continued for 3 hours, decantation was conducted. The solution was diluted 32 times, and the amount of the liquid was then adjusted to 200 ml.

Thereto was added 4.0 g of titanium ethoxide with stirring. A solution prepared beforehand by mixing 2.0 g of deionized water with 23.4 g of ethanol was gradually added dropwise to the mixture with stirring. Stirring was continued for 3 hours after the addition. Thereafter, decantation was conducted, and the solution was diluted 32 times.

After the dilution, the amount of the liquid was adjusted to 200 ml. To this liquid were added, with stirring, 16.0 g of ammonia water (29%) and 11 g of deionized water, followed by 10.4 g of silicon ethoxide. Stirring was then continued for 3 hours. Thereafter, decantation was conducted, and the solution was diluted 32 times. After the dilution, the amount of the liquid was adjusted to 200 ml.

To the liquid was further added 6.0 g of titanium ethoxide with stirring. A solution prepared beforehand by mixing 4.0 g of deionized water with 23.4 g of ethanol was gradually added dropwise to the resultant mixture with stirring. Stirring was continued for 3 hours after the addition. Thereafter, stirring was stopped and the solid matter was separated from the liquid by filtration. The solid matter was dried at 80° C. for 5 hours. An examination with a spectrophotometer revealed that the resultant dry powder had a whiteness of 47.

The dry powder was subjected to a heat treatment. Using a controlled-atmosphere furnace, the dry powder was heated to 450° C. in a nitrogen atmosphere, kept at 450° C. for 30 minutes, and then cooled. The cooled powder was taken out of the furnace. Thus, a heat-treated powder coated with alternate four layers consisting of titanium oxide (second and fourth layers) and silicon oxide (first and third layers) was obtained.

The thus-obtained heat-treated powder coated with alternate four layers of titanium oxide and silicon oxide had a whiteness of 61, and had a reflectance higher by 30% than that prior to the heat treatment.

The silicon oxide films had a refractive index of 1.4, and the thicknesses of the first and third layers were 89 nm and 125 nm, respectively. The titanium oxide films had a refractive index of 2.1, and the thicknesses of the second and fourth layers were 52 nm and 85 nm, respectively.

EXAMPLE 4

(Coating with First-layer Titania)

In a vessel, 3.5 g of titanium ethoxide was mixed with 200 ml of ethanol to prepare a-solution. To this solution were added 5 g of glass beads (average particle diameter, 35 μm)

manufactured by Toshiba Valotini Co. The resultant mixture was treated with an ultrasonic vessel to disperse the beads. A solution prepared beforehand by mixing 2.0 g of water with 60 ml of ethanol was added dropwise to the solution containing glass beads with a buret over a period of 30 minutes while stirring the bead-containing solution with a stirrer. Stirring was continued for 3 hours after the addition, and the solid matter was then separated from the liquid by filtration.

The solid matter obtained through filtration was dried at 100° C. for 5 hours with a vacuum dryer, and then heat-treated for 30 minutes in an electric furnace maintained at 550° C. Thus, glass beads coated with titania were obtained.
(Coating with Second-layer Silica)

Five grams of the titania-coated glass beads were mixed with 200 ml of ethanol and 3.0 g of silicon ethoxide. The resultant mixture was treated with an ultrasonic vessel to disperse the beads. A solution prepared beforehand by mixing 5.0 g of ammonia water with 5.0 g of water was added to the solution containing glass beads with stirring with a stirrer.

Stirring was continued for 5 hours after the addition, and the solid matter was then separated from the liquid by filtration.

The solid matter obtained through filtration was dried at 100° C. for 5 hours with a vacuum dryer, and then heat-treated for 30 minutes in an electric furnace maintained at 550° C. to obtain glass beads coated with titania and silica.
(Coating with Third-layer Titania)

Five grams of the glass beads coated with titania and silica were mixed with 200 ml of ethanol and a solution of 3.2 g of titanium ethoxide in 200 ml of ethanol. The resultant mixture was treated with an ultrasonic vessel to disperse the beads. A solution prepared beforehand by mixing 1.8 g of water with 60 ml of ethanol was added dropwise to the solution containing glass beads with a buret over a period of 30 minutes while stirring the bead-containing solution with a stirrer. Stirring was continued for 3 hours after the addition, and the solid matter was then separated from the liquid by filtration. The powder thus coated with three layers had a light, bluish-greenish white. This powder had a maximum reflection peak at 500 nm and had a reflectance of 85%, which was higher by 15% than the reflectance of 70 for the original glass beads.
(Coating with Fourth-layer Silica)

Five grams of the titania-coated glass beads were mixed with 200 ml of ethanol and 3.3 g of silicon ethoxide. The resultant mixture was treated with an ultrasonic vessel to disperse the beads. A solution prepared beforehand by mixing 5.5 g of ammonia water with 5.0 g of water was added dropwise to the solution containing glass beads with stirring with a stirrer.

Stirring was continued for 5 hours after the addition, and the solid matter was then separated from the liquid by filtration.

The solid matter obtained through filtration was dried at 100° C. for 5 hours with a vacuum dryer, and then heat-treated for 30 minutes in an electric furnace maintained at 550° C. to obtain glass beads coated with titania and silica.
(Coating with Fifth-layer Titania)

Five grams of the glass beads coated with titania and silica were mixed with 200 ml of ethanol and a solution of 3.85 g of titanium ethoxide in 200 ml of ethanol. The resultant mixture was treated with an ultrasonic vessel to disperse the beads. A solution prepared beforehand by mixing 2.4 g of water with 60 ml of ethanol was added dropwise to the solution containing glass beads with a buret over a period of 30 minutes while stirring the bead-containing solution with a stirrer. Stirring was continued for 3 hours after the addition, and the solid matter was then separated from the liquid by filtration. The powder thus coated with five layers gave, in the visible light region, a spectral reflection curve having a broad waveform with no distinct reflection peak. The powder as a whole had a reflectance of 96%, which had been increased by 11%. This powder was white.

The five layers were formed so as to have such compositions that the second and third layers each had a peak at 500 nm and the fourth and fifth layers each had a peak at 650 nm. This constitution is thought to have made the coated powder give the spectral reflection curve having a broad waveform and thus rendered the powder white.

The titania films had a refractive index of 2.2, and the thicknesses of the first, third, and fifth layers were 76 nm, 56 nm, and 84 nm, respectively. The silica films had a refractive index of 1.4, and the thicknesses of the second and fourth layers were 81 nm and 120 nm, respectively.

EXAMPLE 5
(Coating with First-layer Silica)

Into 200 ml of ethanol was dispersed 20 g of an iron carbonyl powder (average particle diameter, 1.8 µm) manufactured by BASF AG. To this dispersion were added 8 g of silicon ethoxide and ammonia water (29%). Reaction was conducted for 5 hours with stirring. After the reaction, the reaction mixture was diluted and washed with ethanol, and then filtered. The solid matter obtained was dried at 110° C. for 3 hours with a vacuum dryer, and then heat-treated at 650° C. for 30 minutes with a rotating tubular furnace to obtain a silica-coated powder A.

After the heat treatment, 20 g of the silica-coated powder A obtained was dispersed into 200 ml of ethanol. To this dispersion were added 6 g of silicon ethoxide and 8 g of ammonia water (29%). Reaction was conducted for 5 hours. The resultant solid matter was subjected to vacuum drying and heat treatment in the same manner as in the first coating to obtain a silica-coated powder B. The silica-coated powder B obtained had satisfactory dispersibility and was made up of primary particles.
(Coating with Second-layer Titania)

Into 250 ml of ethanol was dispersed 8 g of the silica-coated powder B. To this dispersion was added 3 g of titanium ethoxide. A solution prepared by mixing 30 ml of ethanol with 3.0 g of water was further added thereto dropwise over a period of 30 minutes. Thereafter, reaction was conducted for 3 hours. After the reaction, the reaction mixture was diluted and washed with ethanol, and then filtered. The solid matter obtained was dried at 110° C. for 3 hours with a vacuum dryer, and then heat-treated at 650° C. for 30 minutes with a rotating tubular furnace to obtain a silica- and titania-coated powder A.

This silica- and titania-coated powder A was further coated in the same manner as in the first titania coating, as follows. Into 250 ml of ethanol was dispersed 8 g of the powder. Thereto was added 3 g of titanium ethoxide. A solution prepared by mixing 30 ml of ethanol with 3.0 g of water was further added thereto dropwise over a period of 30 minutes. Thereafter, reaction was conducted for 3 hours. The resultant solid matter was vacuum-dried and then heat-treated. Thus, a silica- and titania-coated powder B was obtained.

The powder obtained had satisfactory dispersibility and was made up of primary particles.

This powder gave a spectral reflection curve having a peak at a wavelength of 552 nm, and had a reflectance at the peak wavelength of 40%. It had a bright green color.

The silica films had a refractive index of 1.5, and the thicknesses of the first and third layers were 95 nm and 100 nm, respectively. The titania films had a refractive index of 2.4, and the thicknesses of the second and fourth layers were 79 nm and 85 nm, respectively.

EXAMPLE 6
(Coating with First-layer Silica)

Into 200 ml of ethanol was dispersed 40 g of an iron carbonyl powder (average particle diameter, 1.8 gm) manufactured by BASF AG. To this dispersion were added 6 g of silicon ethoxide and 8 g of ammonia water (29%). Reaction was conducted for 5 hours with stirring. After the reaction, the reaction mixture was diluted and washed with ethanol, and then filtered. The solid matter obtained was dried at 110° C. for 3 hours with a vacuum dryer, and then heat-treated at 650° C. for 30 minutes with a rotating tubular furnace to obtain a silica-coated powder C.

After the heat treatment, 40 g of the silica-coated powder C obtained was dispersed into 200 ml of ethanol. To this dispersion were added 6 g of silicon ethoxide and 8 g of ammonia water (29%). Reaction was conducted for 5 hours. The resultant solid matter was subjected to vacuum drying and heat treatment in the same manner as in the first coating to obtain a silica-coated powder D. The silica-coated powder B obtained had satisfactory dispersibility and was made up of primary particles.

(Coating with Second-layer Titania)

Into 250 ml of ethanol was dispersed 16 g of the silica-coated powder B. To this dispersion was added 3 g of titanium ethoxide. A solution prepared by mixing 30 ml of ethanol with 3.0 g of water was further added thereto dropwise over a period of 30 minutes. Thereafter, reaction was conducted for 3 hours. After the reaction, the reaction mixture was diluted and washed with ethanol, and then filtered. The solid matter obtained was dried at 110° C. for 3 hours with a vacuum dryer, and then heat-treated at 650° C. for 30 minutes with a rotating tubular furnace to obtain a silica- and titania-coated powder C.

This silica- and titania-coated powder C was further coated in the same manner as in the first titania coating, as follows. Into 250 ml of ethanol was dispersed 16 g of the powder. Thereto was added 3 g of titanium ethoxide. A solution prepared by mixing 30 ml of ethanol with 3.0 g of water was further added thereto dropwise over a period of 30 minutes. Thereafter, reaction was conducted for 3 hours. The resultant solid matter was vacuum-dried and then heat-treated. Thus, a silica- and titania-coated powder D was obtained.

The powder obtained had satisfactory dispersibility and made up of primary particles.

This powder gave a spectral reflection curve having a peak at a wavelength of 455 nm, and had a reflectance at the peak wavelength of 43%. It had a bright blue color.

The silica films had a refractive index of 2.4, and the thicknesses of the first and third layers were 56 nm and 66 nm, respectively. The titania films had a refractive index of 1.5, and the thicknesses of the second and fourth layers were 48 nm and 60 nm, respectively.

EXAMPLE 7
(Coating with First-layer Silica)

Into 200 ml of ethanol was dispersed 20 g of an iron carbonyl powder (average particle diameter, 1.8 nm) manufactured by BASF AG. To this dispersion were added 8 g of silicon ethoxide and ammonia water (29%). Reaction was conducted for 5 hours with stirring. After the reaction, the reaction mixture was diluted and washed with ethanol, and then filtered. The solid matter obtained was dried at 110° C. for 3 hours with a vacuum dryer, and then heat-treated at 650° C. for 30 minutes with a rotating tubular furnace to obtain a silica-coated powder E.

After the heat treatment, 20 g of the silica-coated powder E obtained was dispersed into 200 ml of ethanol. To this dispersion were added 6 g of silicon ethoxide and 8 g of ammonia water (29%). Reaction was conducted for 5 hours. The resultant solid matter was subjected to vacuum drying and heat treatment in the same manner as in the first coating to obtain a silica-coated powder F. The silica-coated powder B obtained had satisfactory dispersibility and was made up of primary particles.

(Coating with Second-layer Titania)

Into 250 ml of ethanol was dispersed 16 g of the silica-coated powder F. To this dispersion was added 3 g of titanium ethoxide. A solution prepared by mixing 30 ml of ethanol with 3.0 g of water was further added thereto dropwise over a period of 30 minutes. Thereafter, reaction was conducted for 2 hours, and a solution prepared by mixing 30 ml of ethanol with 3.0 g of water was added again dropwise to the resultant reaction mixture over a period of 30 minutes. After this mixture was reacted for 7 hours, the reaction mixture was diluted and washed with ethanol. The solid matter obtained was dried at 110° C. for 3 hours with a vacuum dryer, and then heat-treated at 650° C. for 30 minutes with a rotating tubular furnace to obtain a silica- and titania-coated powder E.

This silica- and titania-coated powder C was further coated in the same manner as in the first titania coating, as follows. Into 250 ml of ethanol was dispersed 16 g of the powder. Thereto was added 3 g of titanium ethoxide. A solution prepared by mixing 30 ml of ethanol with 3.0 g of water was further added thereto dropwise over a period of 30 minutes. Thereafter, reaction was conducted for 3 hours and for 2 hours, and a solution prepared by mixing 30 ml of ethanol with 3.0 g of water was added again dropwise to the resultant reaction mixture over a period of 30 minutes. After this mixture was reacted for 7 hours, the reaction mixture was diluted and washed with ethanol. The resultant solid matter was vacuum-dried and then heat-treated. Thus, a silica- and titania-coated powder F was obtained.

The powder obtained had satisfactory dispersibility and was made up of primary particles. This powder gave a spectral reflection curve having a peak at a wavelength of 780 nm, and had a reflectance at the wavelength of 40%. It had a bright purplish red color.

The silica films had a refractive index of 1.5, and the thicknesses of the first and third layers were 135 nm and 160 nm, respectively. The titania films had a refractive index of 2.4, and the thicknesses of the second and fourth layers were 79 nm and 100 nm, respectively.

EXAMPLE 8
(Coating with First-layer Silica)

Into 200 ml of ethanol was dispersed 20 g of an iron carbonyl powder (average particle diameter, 1.8 μm) manufactured by BASF AG. To this dispersion were added 8 g of silicon ethoxide and ammonia water (29%). Reaction was conducted for 5 hours with stirring. After the reaction, the reaction mixture was diluted and washed with ethanol, and then filtered. The solid matter obtained was dried at 110° C. for 3 hours with a vacuum dryer, and then heat-treated at 650° C. for 30 minutes with a rotating tubular furnace to obtain a silica-coated powder E.

After the heat treatment, 20 g of the silica-coated powder E obtained was dispersed into 200 ml of ethanol. To this dispersion were added 6 g of silicon ethoxide and 8 g of ammonia water (29%). Reaction was conducted for 5 hours. The resultant solid matter was subjected to vacuum drying and heat treatment in the same manner as in the first coating to obtain a silica-coated powder F. The silica-coated powder B obtained had satisfactory dispersibility and was made up of primary particles.

(Formation of Silver Film as Second Layer by Electroless Plating)

In 600 ml of water was dissolved 17.5 g of silver nitrate. Thereto was added an aqueous solution prepared beforehand by dissolving 20 g of distilled water sodium hydroxide in 600 ml of water. Ammonia water was added to the mixture until the resultant precipitate of silver oxide disappeared. Thus, a silver solution was prepared.

Into this silver solution was dispersed 10 g of an iron carbonyl powder (average particle diameter, 1.8 $\mu$m) manufactured by BASF AG. To this dispersion was added, with stirring, 1,200 ml of a reducing solution prepared beforehand.

The reducing solution had a composition consisting of 1,000 ml of distilled water, 45 g of glucose, 4 g of tartaric acid, and 100 ml of ethanol.

After the resultant mixture was stirred for 20 minutes, the solid matter was washed with a sufficient amount of ethanol, vacuum-dried at room temperature for 8 hours, and then heat-treated at 400° C. for 30 minutes. Thus, a silver-coated powder A was obtained.

(Coating with Third-layer Titania)

Into 250 ml of ethanol was dispersed 8 g of the silver-coated powder A. To this dispersion was added 3 g of titanium ethoxide. A solution prepared by mixing 30 ml of ethanol with 3.0 g of water was further added thereto dropwise over a period of 30 minutes. Thereafter, reaction was conducted for 2 hours, and a solution prepared by mixing 30 ml of ethanol with 3.0 g of water was added again dropwise to the resultant reaction mixture over a period of 30 minutes.

After this mixture was reacted for 7 hours, the reaction mixture was diluted and washed with ethanol. The solid matter obtained was dried at 110° C. for 3 hours with a vacuum dryer, and then heat-treated at 400° C. for 30 minutes with a rotating tubular furnace to obtain a silver- and titania-coated powder A.

The thus-obtained silver- and titania-coated powder A had a reflectance of 70% at the peak wavelength of 650 nm. It had a bright yellow color.

The silica film had a refractive index of 1.5 and a thickness of 135 nm. The silver metal film had a refractive index of 0.1+5.3i and a thickness of 32 nm. The titania film had a refractive index of 2.4 and a thickness of 66 nm.

INDUSTRIAL APPLICAPABILITY

According to the present invention, since metal oxide films having heightened refractive indexes can be formed on base particles, the coated powder has a heightened reflectance and the color of the base particles can be hidden. Thus, a white or colored material can be obtained.

In particular, by forming a multilayered film comprising high-refractive-index films stacked alternately with low-refractive-index films on the surface of particles, interference by the multilayered film can be utilized to obtain a heightened visible-light reflectance and a heightened ultraviolet absorbance. In addition, an interference color can be used to color the powder.

Since a multilayered film having a heightened reflectance is obtained, the same visible-light reflectance can be obtained with a reduced number of coating films. As a result, the particles can have a reduced diameter according to the reduced volume of the coating films.

The metal oxide films formed by hydrolysis undergo sintering upon heat treatment after drying to have an enhanced film strength. Consequently, the coating films can be prevented from cracking or peeling off when the coated particles are kneaded together with a resin, etc.

Furthermore, by conducting the hydrolysis of a metal alkoxide while varying the concentration of the metal alkoxide in a solution thereof, metal oxide films having various thicknesses can be formed to produce various interference colors. Thus, various powder colors can be obtained.

What is claimed is:

1. A powder having a multilayered film on its surface which comprises base particle having provided thereon a multilayered film (a) comprising at least a metal oxide film formed by hydrolyzing a metal alkoxide, and (b) is treated by heating.

2. The powder having a multilayered film on its surface according to claim 1, wherein the base particle is a metal particle or a metal compound particle.

3. The powder having a multilayered film on its surface according to claim 1, wherein the base particle has magnetic properties.

4. The powder having a multilayered film on its surface according to claim 1, wherein the multilayered film has at least one metal film.

5. The powder having a multilayered film on its surface according to claim 1, wherein the unit film layers constituting the multilayered film each have a thickness so as to have an interference reflection peak or an interference transmission bottom at the same specific wavelength.

6. The powder having a multilayered film on its surface according to claim 5, wherein the actual thickness of each unit film layer is decided by correcting a basic film thickness which satisfies the following equation (1):

$$n \times d = m \times \lambda / 4 \quad (1)$$

(wherein $\bar{n}$ represents the complex refractive index; d represents the basic film thickness; m represents an integer (natural number); $\lambda$ represents the wavelength at which the interference reflection peak or the interference transmission bottom appears; and h is defined by the following equation (2):

$$\bar{n} = n + i\kappa \quad (2)$$

(wherein n represents the refractive index of each unit film layer; i represents a complex number; and $\kappa$ represents the attenuation coefficient))
based on functions consisting of a phase shift attributable to the attenuation coefficient $\kappa$ of refractive index, a phase shift occurring at a film interface, the dispersion of refractive index, and a peak shift attributable to the particle shape so that the individual unit film layers have an interference reflection peak or an interference transmission bottom at the same specific wavelength.

7. A process for producing a powder having a multilayered film on its surface which comprises:

dispersing a base particle into a solution of a metal alkoxide;

hydrolyzing the metal alkoxide to obtain a metal oxide and deposit a film of the metal oxide on the surface of the base particle;

drying the metal oxide film;

subsequently heat-treating the dried metal oxide film to form a heat-treated metal oxide film; and conducting the above steps at least once to form a multilayered film.

8. A process for producing a powder having a multilayered film on its surface which comprises:
   dispersing a base particle into a solution of a metal alkoxide;
   hydrolyzing the metal alkoxide to obtain a metal oxide and deposit a film of the metal oxide on the surface of the base particle;
   drying the metal oxide film to form a dried metal oxide film;
   conducting the above steps at least once to form a multilayered film; and
   heat-treating the multilayered film as a final step.

9. A process for producing a powder having a multilayered film on its surface which comprises:
   dispersing a base particle into a solution of a metal alkoxide;
   hydrolyzing the metal alkoxide to obtain a metal oxide and deposit a film of the metal oxide on the surface of the base particle;
   conducting the above steps at least once to form a multilayered film;
   drying the multilayered film; and
   heat-treating the dried multilayered film.

10. The process for producing a powder having a multilayered film on its surface according to any one of claims 7 to 9, wherein at least one metal film is formed before the steps of forming a metal oxide film on the surface of the base particle or between or after the steps of forming a metal oxide film.

11. The process for producing a powder having a multilayered film on its surface according to any one of claims 7 to 10, wherein the thicknesses of the unit film layers constituting the multilayered film are regulated so that the unit film layers have an interference reflection peak at the same specific wavelength.

12. The process for producing a powder having a multilayered film on its surface according to claim 11, wherein the actual thickness of each unit film layer is decided by correcting a basic film thickness which satisfies the following equation (1):

$$n \times d = m \times \lambda/4 \quad (1)$$

(wherein n represents the complex refractive index; d represents the basic film thickness; m represents an integer (natural number); λ represents the wavelength at which the interference reflection peak or the interference transmission bottom appears; and R is defined by the following equation (2):

$$E = n + i\kappa \quad (2)$$

(wherein n represents the refractive index of each unit film layer; i represents a complex number; and κ represents the attenuation coefficient))
based on functions consisting of a phase shift attributable to the attenuation coefficient κ of refractive index, a phase shift occurring at a film interface, the dispersion of refractive index, and a peak shift attributable to the particle shape so that the individual unit film layers have an interference reflection peak or an interference transmission bottom at said same specific wavelength.

13. The powder having a multilayered film on its surface according to claim 1, wherein the powder is heated to at least 100° C.

14. The powder having a multilayered film on its surface according to claim 1, wherein the powder is heated to from 120° C. to 1000° C.

15. The powder having a multilayered film on its surface according to claim 1, wherein the powder is heated to at least 200° C.

16. The powder having a multilayered film on its surface according to claim 1, wherein the powder is heated to from 300° C. to 650° C. for a period of from 1 minute to 3 hours.

17. The powder having a multilayered film on its surface according to claim 1, which is white in color.

18. The powder having a multilayered film on its surface according to claim 1, which has a color other than white.

19. The powder having a multilayered film on its surface according to claim 1, wherein said powder has a color selected from the group consisting of blue, green, yellow and purplish red.

20. The process for producing a powder having a multilayered film on its surface according to claim 7, wherein the heat-treating takes place at a temperature of least 100° C.

21. The process for producing a powder having a multilayered film on its surface according to claim 7, wherein the heat-treating takes place at a temperature of from 120° C. to 1000° C.

22. The process for producing a powder having a multilayered film on its surface according to claim 7, wherein the heat-treating takes place at a temperature of at least 200° C.

23. The process for producing a powder having a multilayered film on its surface according to claim 7, wherein the heat-treating takes place at a temperature of from 300° C. to 650° C. for a period of from 1 minute to 3 hours.

24. The process for producing a powder having a multilayered film on its surface according to claim 7, wherein said powder is white in color.

25. The process for producing a powder having a multilayered film on its surface according to claim 7, wherein said powder has a color other than white.

26. The process for producing a powder having a multilayered film on its surface according to claim 7, wherein said powder has a color selected from the group consisting of blue, green, yellow and purplish red.

27. The process for producing a powder having a multilayered film on its surface according to claim 8, wherein the heat-treating takes place at a temperature of least 100° C.

28. The process for producing a powder having a multilayered film on its surface according to claim 8, wherein the heat-treating takes place at a temperature of from 120° C. to 1000° C.

29. The process for producing a powder having a multilayered film on its surface according to claim 8, wherein the heat-treating takes place at a temperature of at least 200° C.

30. The process for producing a powder having a multilayered film on its surface according to claim 8, wherein the heat-treating takes place at a temperature of from 300° C. to 650° C. for a period of from 1 minute to 3 hours.

31. The process for producing a powder having a multilayered film on its surface according to claim 8, wherein said powder is white in color.

32. The process for producing a powder having a multilayered film on its surface according to claim 8, wherein said powder has a color other than white.

33. The process for producing a powder having a multilayered film on its surface according to claim 8, wherein said powder has a color selected from the group consisting of blue, green, yellow and purplish red.

34. The process for producing a powder having a multilayered film on its surface according to claim 9, wherein the heat-treating takes place at a temperature of at least 100° C.

35. The process for producing a powder having a multi-layered film on its surface according to claim 9, wherein the heat-treating takes place at a temperature of from 120° C. to 1000° C.

36. The process for producing a powder having a multi-layered film on its surface according to claim 9, wherein the heat-treating takes place at a temperature of at least 200° C.

37. The process for producing a powder having a multi-layered film on its surface according to claim 9, wherein the heat-treating takes place at a temperature of from 300° C. to 650° C. for a period of from 1 minute to 3 hours.

38. The process for producing a powder having a multi-layered film on its surface according to claim 9, wherein said powder is white in color.

39. The process for producing a powder having a multi-layered film on its surface according to claim 9, wherein said powder has a color other than white.

40. The process for producing a powder having a multi-layered film on its surface according to claim 9, wherein said powder has a color selected from the group consisting of blue, green, yellow, and purplish red.

* * * * *